(12) United States Patent
Boss et al.

(10) Patent No.: US 7,595,717 B2
(45) Date of Patent: *Sep. 29, 2009

(54) METHOD, SYSTEM, AND COMPUTER PROGRAM PRODUCT FOR PROVIDING AN INTELLIGENT EVENT NOTIFICATION SYSTEM

(75) Inventors: Gregory J. Boss, American Fork, UT (US); Rick A. Hamilton, II, Charlottesville, VA (US); Nicholas R. Trio, Carmel, NY (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/124,536

(22) Filed: May 21, 2008

(65) Prior Publication Data
US 2008/0218318 A1  Sep. 11, 2008

Related U.S. Application Data

(63) Continuation of application No. 11/098,334, filed on Apr. 4, 2005, now Pat. No. 7,400,229.

(51) Int. Cl.
*G05B 11/01* (2006.01)
(52) U.S. Cl. .............................. 340/309.16
(58) Field of Classification Search ............ 340/309.16, 340/457, 384.71; 455/412.1, 412.2; 368/243
See application file for complete search history.

(56) References Cited

U.S. PATENT DOCUMENTS

| | | | |
|---|---|---|---|
| 6,477,565 B1 | 11/2002 | Daswani et al. | |
| 6,560,318 B1 | 5/2003 | Spielman et al. | |
| 7,109,848 B2 * | 9/2006 | Schybergson | 340/309.7 |
| 2001/0049275 A1 * | 12/2001 | Pierry et al. | 455/414 |
| 2003/0023690 A1 | 1/2003 | Lohtia | |
| 2003/0083051 A1 * | 5/2003 | Ntende | 455/414 |
| 2003/0131142 A1 | 7/2003 | Horvitz et al. | |
| 2003/0132298 A1 | 7/2003 | Swartz et al. | |
| 2003/0182263 A1 | 9/2003 | Augustine et al. | |
| 2003/0222765 A1 * | 12/2003 | Curbow et al. | 340/309.7 |
| 2004/0003042 A1 | 1/2004 | Horvitz et al. | |
| 2004/0030753 A1 | 2/2004 | Horvitz | |

(Continued)

FOREIGN PATENT DOCUMENTS

EP 1280314 A2 1/2003

*Primary Examiner*—Phung Nguyen
(74) *Attorney, Agent, or Firm*—Cantor Colburn LLP; Derek Jennings

(57) ABSTRACT

A computer program product for providing an intelligent event notification system includes instructions for implementing a method. The method includes selecting a type of event notification for an event. Determining the type of event notification is based in part on information elements associated with the event. The method also includes determining at least one optimal alert system to receive an event notification corresponding to the type of event notification selected. The determination is based in part on information elements associated with the event. The method further includes associating an alert trigger with the event notification and transmitting the event notification to the at least one optimal alert system upon activation of the alert trigger. The event notification type includes a supplemental information notification specifying activities to be performed in advance of, or in preparation for, the event.

18 Claims, 6 Drawing Sheets

U.S. PATENT DOCUMENTS

| | | |
|---|---|---|
| 2004/0064567 A1 | 4/2004 | Doss et al. |
| 2004/0087300 A1 | 5/2004 | Lewis |
| 2004/0103411 A1 | 5/2004 | Thayer |
| 2005/0060720 A1* | 3/2005 | Mayer ........................ 719/318 |
| 2005/0075095 A1* | 4/2005 | Dillon ..................... 455/412.2 |
| 2005/0096095 A1* | 5/2005 | Benco et al. ................ 455/567 |
| 2006/0203620 A1* | 9/2006 | Bedingfield ................ 368/247 |

* cited by examiner

(12) United States Patent
US 7,595,717 B2

METHOD, SYSTEM, AND COMPUTER PROGRAM PRODUCT FOR PROVIDING AN INTELLIGENT EVENT NOTIFICATION SYSTEM

CROSS-REFERENCE TO RELATED APPLICATION

This application is a continuation of U.S. patent application Ser. No. 11/098,334, filed Apr. 4, 2005, now U.S. Pat. No. 7,400,229 the disclosure of which is incorporated by reference herein in its entirety.

BACKGROUND OF THE INVENTION

The present disclosure relates generally to time management systems, and, in particular, to a method, system, and storage medium for providing an intelligent event notification system.

An issue of ever-increasing importance in modern society is time management. Tools, software, hardware, and even class instruction abound that promote and teach time management skills. However, few systems exist that integrate various time-management technologies for easing the burdens relating to scheduling functions. For example, multiple time management processes may be relied upon by individuals on a daily basis (e.g., alarm clocks, calendaring programs, wake up call services, etc.). With the growing number of time-management tools on the market, it oftentimes becomes cumbersome to manage these tools in an efficient manner. While technologies today offer some assistance in organizing various time management tools/devices (e.g., synchronization of a calendar on a PDA with a personal computer calendar), there continues to be a need for ways to efficiently manage time that alleviate the burdens associated with utilizing multiple time management tools.

BRIEF SUMMARY OF THE INVENTION

Exemplary embodiments include a computer program product for providing intelligent event notification services. The computer program product includes instructions for performing a method. The method includes selecting a type of event notification for an event. Determining the type of event for selection is based, in part, on information elements associated with the event. The method also includes determining at least one optimal alert system to receive an event notification corresponding to the type of event notification selected. The determination is based in part on information elements associated with the event. The method further includes associating an alert trigger with the event notification and transmitting the event notification to the at least one optimal alert system upon activation of the alert trigger. The event notification type includes a supplemental information notification specifying activities to be performed in advance of, or in preparation for, the event.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with exemplary embodiments, a method, system, and computer program product for providing intelligent event notification services is presented. The intelligent event notification services provide a means for centralizing and automating event scheduling and notification processes across multiple devices and multi-media components. An event notification engine associated with the services provides a heuristic approach to processing calendar events that may be combined with programmable event triggers in processing calendar events resulting in an optimized method and means for transmitting event notifications.

Figure 1:
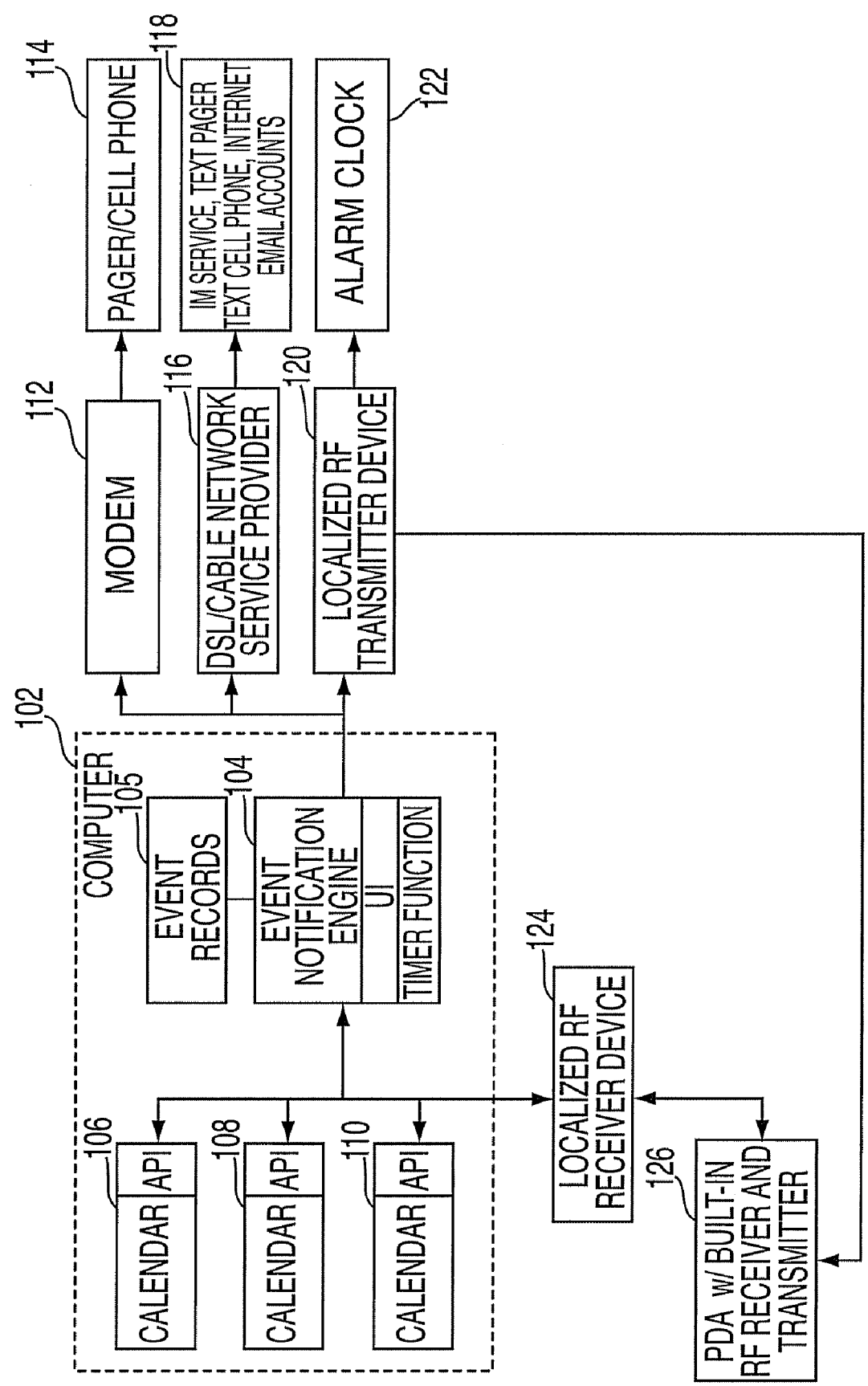
FIG. 1 is a block diagram depicting a system upon which the intelligent event notification system may be implemented in exemplary embodiments.
Figure 3:
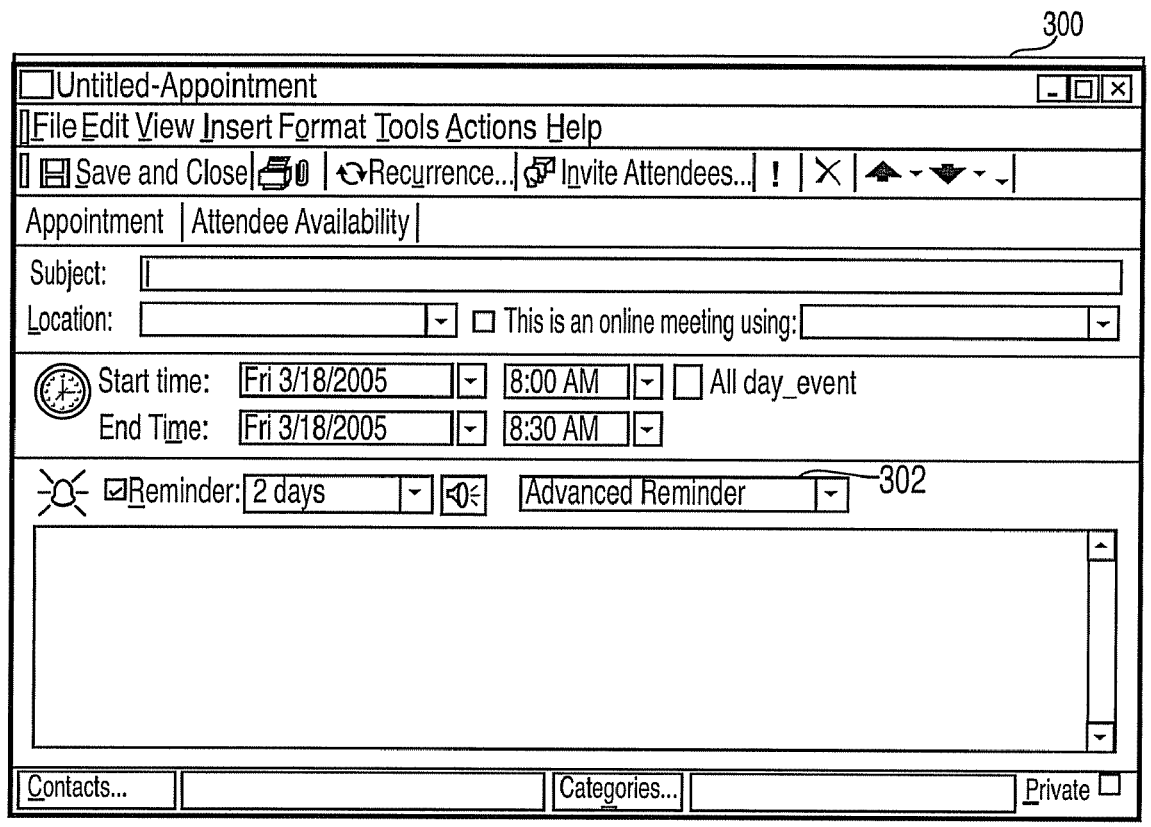
FIG. 3 is a user interface screen depicting a sample event created via an electronic calendaring tool.

Turning now to FIG. 1, a system upon which the intelligent event notification services may be implemented in exemplary embodiments will now be described. The system of FIG. 1 includes a computer system 102 executing an event notification engine 104. Computer system 102 may also include various calendaring or messaging applications (e.g., IBM's Lotus Notes™ calendar application, Microsoft Outlook®, Microsoft Exchange®, etc.). These applications 106-110 enable a user of computer system 102 to enter/edit events or activities for subsequent recall. A sample calendar event created by a user is shown in FIG. 3. Events generated may include, e.g., appointments, meetings, trips, teleconferences, videoconferences, seminars, obligatory activities, or other suitable information. The event notification engine 104 may communicate with calendaring/messaging applications 106-110 via, e.g., corresponding application programming interfaces (APIs) associated therewith.

The event notification engine 104 may comprise one or more applications for implementing the intelligent event notification processes described herein. Additionally, event notification engine 104 may include a user interface (UI) for enabling individuals to perform activities such as configuring the event notification engine 104 to identify and manage devices (also referred to herein as alert systems) subject to receiving event notifications. Event notifications may comprise various types of pre-event reminders or information such as a wake-up call, a recurring reminder presented at specified time intervals, and supplemental information. Supplemental information may include pre-event activities that are related to the event, e.g., making reservations, confirming an event, a car rental, dry cleaning pick up, or personal matters such as canceling newspaper delivery.

Event notification engine 104 may also include a timer function for managing event notifications including providing an alert trigger that causes execution of the event notification. There are various types of alert formats for selection such as audio tones, video images, mechanical vibration, music; light emission, multi-media, etc. The timer function of the event notification engine 104 may be implemented via a clocking device, timestamp instrument, or other similar item. Event notification types, alerts systems, alert triggers, and alert formats are collectively referred to herein as notification elements.

Figure 4:
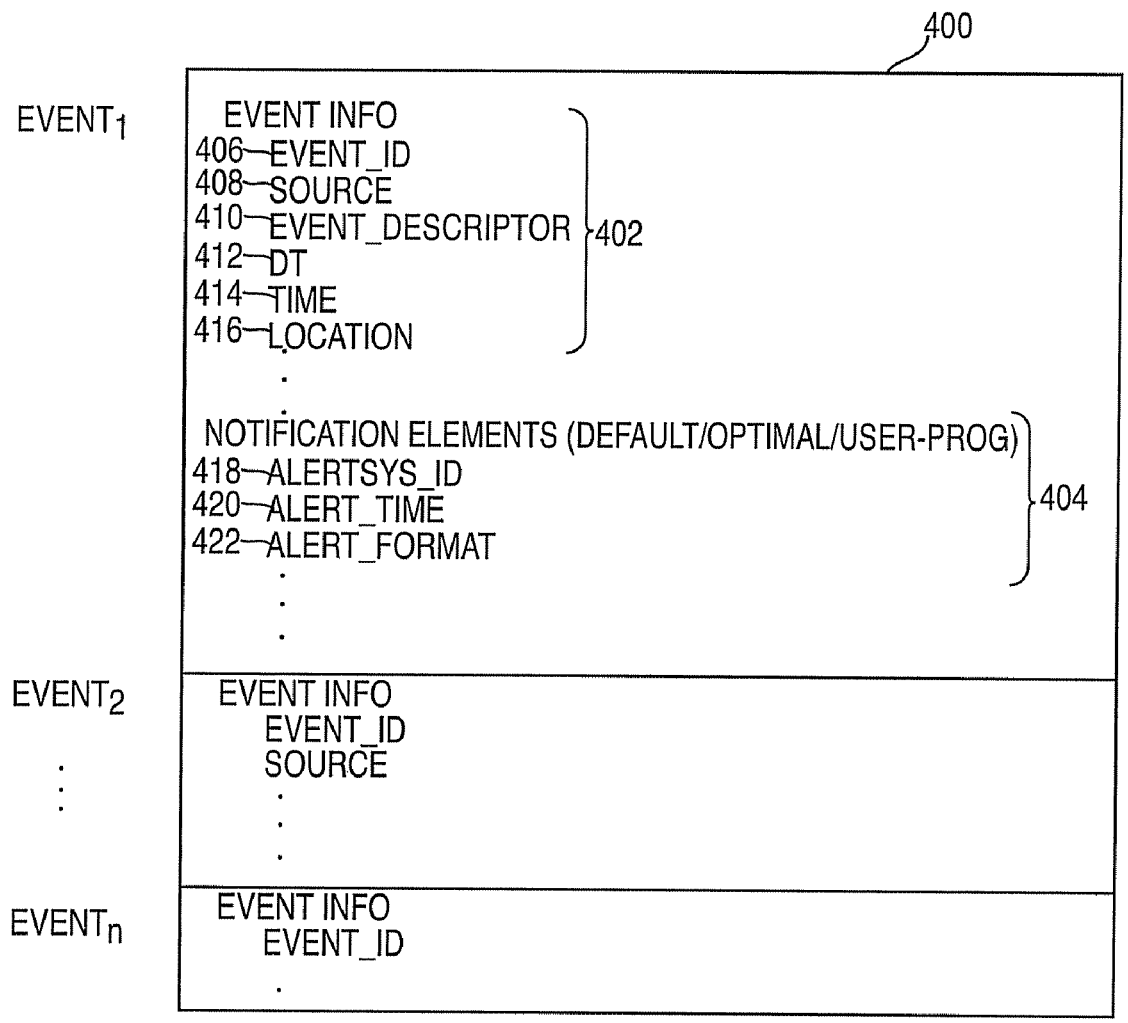
FIG. 4 is a master event file including event records managed by an event notification engine in exemplary embodiments.

Event notification engine 104 is in communication with a master event file 105 that contains event records, which in turn store specific event information for events generated by a user of computer system 102 via, e.g., a calendaring application. For example, event information may include information such as an event descriptor (e.g., meeting, appointment, etc.), an event location, an event time, etc. Master event file 105 may be stored internally in memory associated with the computer system 102 or may be remotely accessible to computer system 102. Event notification engine 104 manages the event records as will be described further herein. A sample master event file 105 is shown in FIG. 4.

A user of computer device 102 may utilize multiple electronic devices (alert systems) for which the intelligent event notification system processes are desired. As shown in FIG. 1, these alert systems include a pager/cell phone 114, an Internet Protocol-enabled device 118 (e.g., text pager, Instant Messaging device, email accounts, etc.), an alarm clock/watch 122, and a personal digital assistant (PDA) 126. Other devices may be included also, such as an MP3 player.

In accordance with exemplary embodiments, the intelligent event notification system processes for these alert systems may be facilitated via a variety of input/output devices, a representative sampling of same shown in the system of FIG. 1 for illustrative purposes. These input/output devices may include a modem (e.g., a standard telephone modem) 112, a digital subscriber line (DSL) or cable network service component 116, a localized radio frequency (RF) transmitter device 120, and a localized radio frequency (RF) receiver device 124. The computer system 102 may be operatively coupled to one or more of these input/output devices as shown in FIG. 1. In exemplary embodiments, the event notification engine 104 acts as an interface to the input/output devices and corresponding alert systems. The DSL or cable network service component 116 provides the computer device 102 with access to the Internet via standard telephone lines or cable lines, respectively. Localized RF receiver device 124 receives over-the-air signals from one or both of computer device 102 and PDA 126. For example, the event notification engine 104 reads event information from PDA 126 via localized RF receiver device 124 and synchronizes the event information with calendar applications 106-110 and other calendar-implemented devices (e.g., 114, 118).

While the event notification engine 104 is shown and described in FIG. 1 as residing on computer system 104, it will be understood by those skilled in the art that the event notification engine 104 may be implemented via other means such as a PDA, laptop, business PC, or other suitable device. The system configuration represented in FIG. 1 is provided for illustrative purposes and is not intended to be limiting in scope.

Figure 2:
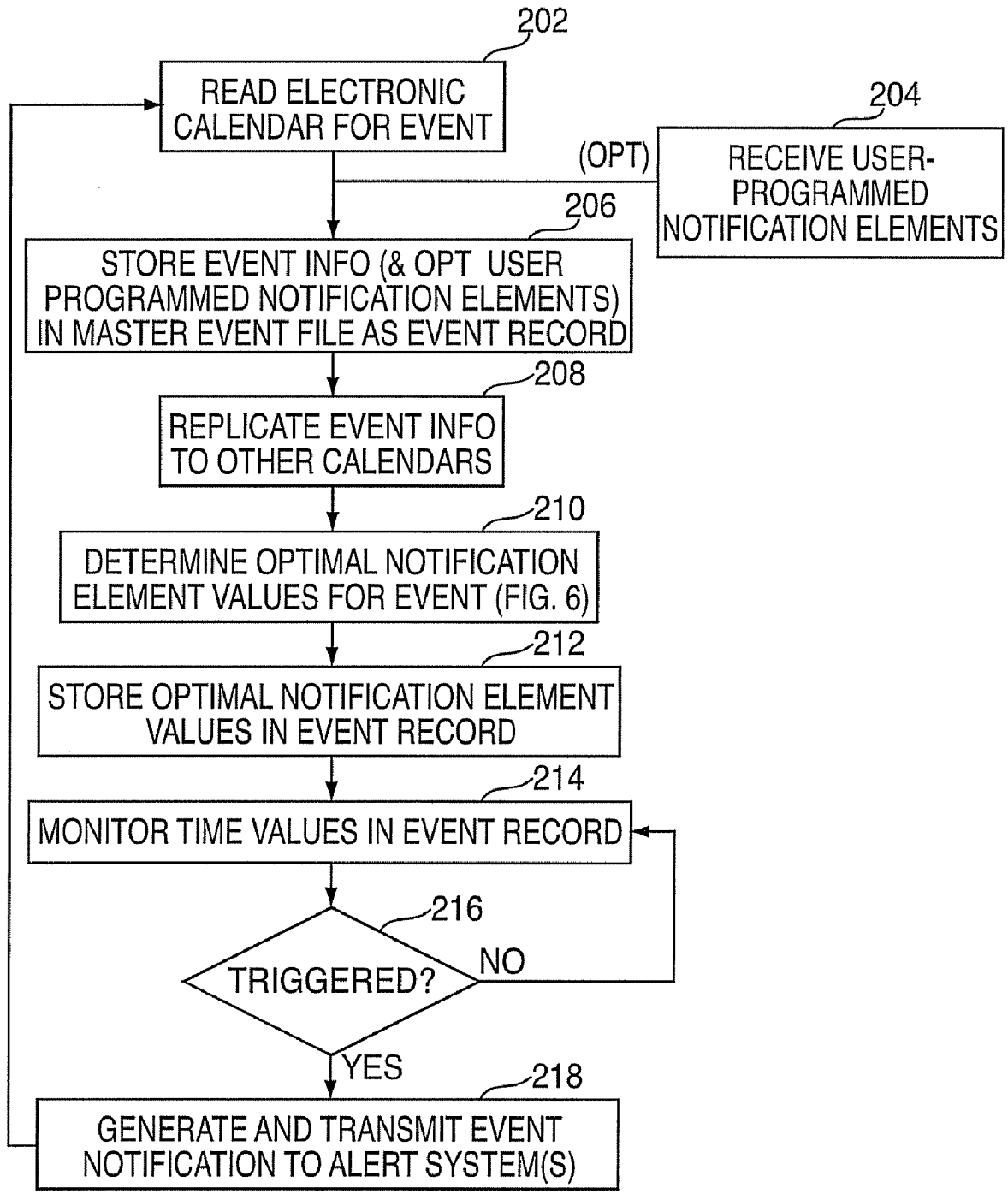
FIG. 2 is a flow diagram describing a process for implementing the intelligent event notification system in exemplary embodiments.

Turning now to FIG. 2, a flow diagram describing a process for implementing the intelligent event notification services in accordance with exemplary embodiments will now be described. The event notification engine 104 receives electronic calendaring information relating to an event (e.g., FIG. 3) from one of calendaring applications 106-110 at step 202. This may be accomplished by monitoring the calendar applications 106-110 and requesting event information (e.g., event descriptor, location, time) from the calendaring applications through, e.g., their corresponding APIs. The monitoring may occur continuously or may be performed at periodic intervals of time. Alternatively, the functionality of the intelligent event notification system may be incorporated directly into calendaring applications 106-110 or the operating system of computer system 102.

In exemplary embodiments, the intelligent event notification system may be configured to receive user-programmed notification elements relating to events. As described above, notification elements may include, e.g., an event notification type, which alert systems or applications should receive an event notification (and may include configuring the event notification system to enable it to identify and communicate with the particular alert system), a time in which the event notification should be relayed (via, e.g., alert trigger or execution of the event notification), a manner of notification or alert format, and any other suitable notification items. The alert format may depend upon the capabilities of the particular alert system. For example, the alert format for an alarm clock may include options such as chimes, buzzer, music (radio or pre-selected item), nature sounds, etc. Likewise, the alert format for a cell phone may be a selected ring tone, song, mechanical vibration, flashing light, etc.

Figure 5:
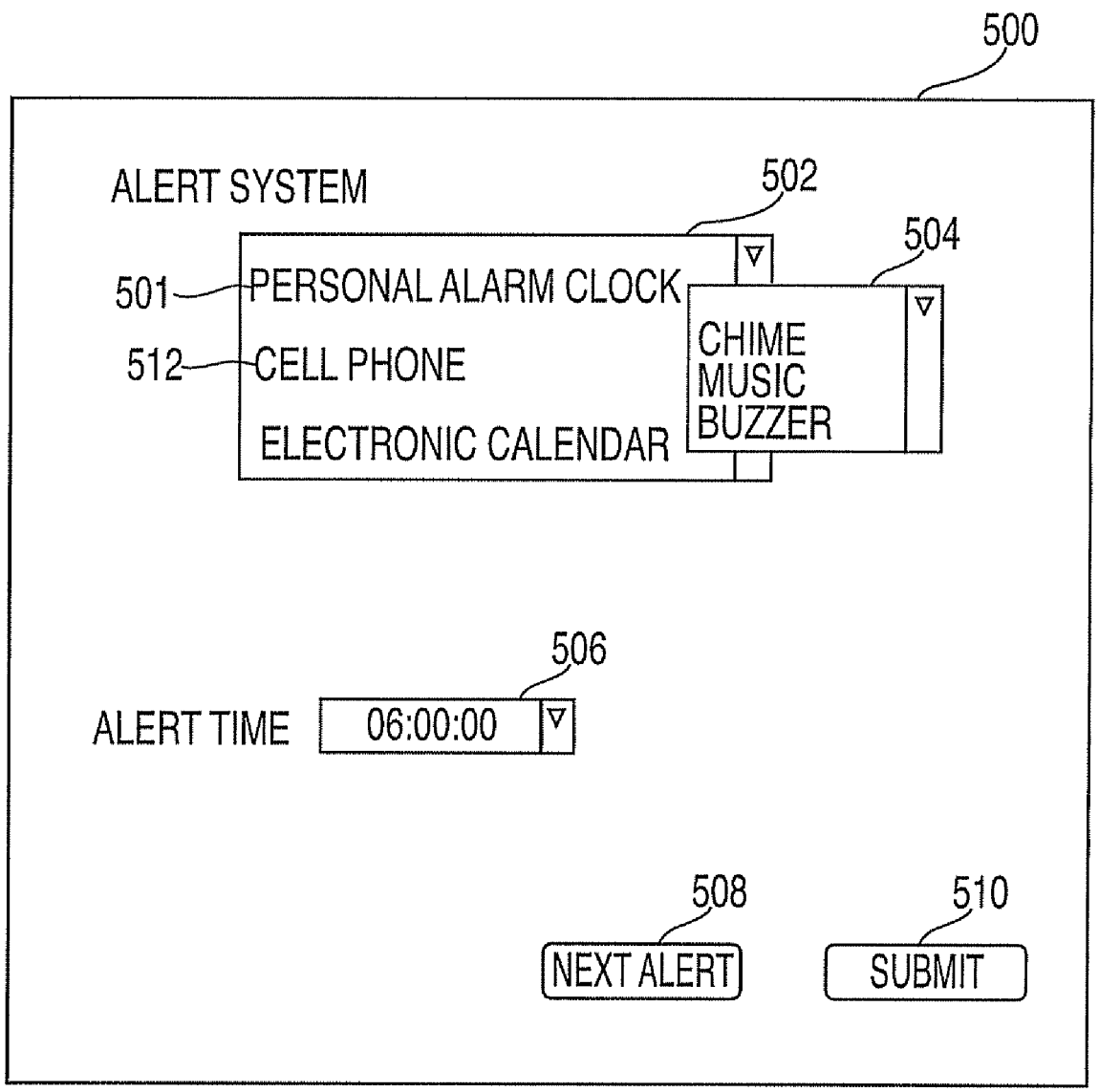
FIG. 5 is a user interface screen illustrating user-programmed notification elements for an event in exemplary embodiments.

A sample selection of notification elements are shown and described in the user interface screen 500 of FIG. 5. If the intelligent event notification system is incorporated into a calendaring application/operating system, the user interface screen 500 of FIG. 5 may be generated via, e.g., an option 302 of user interface screen 300 of FIG. 3). Selection of this option 302 results in a new window 500 of FIG. 5. Alternatively, the user may access the intelligent event notification system processes via the user interface associated with event notification engine 104 (see generally FIG. 1). Likewise, a user interface screen such as that depicted in FIG. 5 may be presented to the user. Multiple alerts or event notifications may be programmed by a user via user interface screen 500 at step 204. Using the example meeting provided in FIG. 3, suppose the user desires to program a wake up call (event notification type) prior to this 8:00 meeting. The user may then select "PERSONAL ALARM CLOCK" 501 from the drop down window 502 shown in FIG. 5. A second window 504 may then be presented to the user. The user may then select from a list of alert formats from second window 504. Next, the user selects an alert time (time trigger) from drop down box 506. The wake up call and other notification event types programmed by the user may be referred to herein as pre-event notifications. This is because, e.g., the wake up call is not the subject of the event (i.e., the subject being the meeting), but rather relates to a notification that indirectly relates to the event. For example, the user may routinely enter an event notification as a reminder to pick up dry cleaning prior to regularly occurring meetings. The former event is referred to as a pre-event as it indirectly relates to the main or primary event (the meeting).

If the user desires to program an additional event notification, the user selects NEXT ALERT 508, otherwise the SUBMIT option 510 is selected to complete the process. A second event notification relating to the first event notification may be configured by the user. For example, using the meeting event created in FIG. 3, suppose the user desires a reminder of the meeting ten minutes prior to the 8:00 meeting start time. The user selects NEXT ALERT 508 and selects, e.g., cell phone 512 from drop down window 502. In the drop down box 506, the user would enter or select 07:50:00.

Returning now to FIG. 2, the event information received from step 202 (and information optionally received from step 204) is stored in an event record in master event file 105 at step 206. Master event file 105 stores event records for events generated via any calendaring application. A sample master event file is shown in greater detail in FIG. 4. The master event file 400 of FIG. 4 includes event records 1-n. Each event record corresponds to an entry in a calendaring application. Each event record is comprised of fields for containing event information elements 402 and event notification elements 404. Fields for event information elements 402 may include an event identifier 406 for distinguishing each event recorded in master event file 400, a source 408 (e.g., the calendaring application from which the event was generated), an event descriptor 410 (e.g., the nature or subject of the event such as an appointment, meeting, trip, etc.), a date 412 (e.g., single date, date range, etc.), a time associated with the event 414 (start time, time range, etc.), location 416 (e.g., room number, building, street, city, state, country, etc.), and any other suitable event information. The time 414 field may be automatically adjusted for differing time zones via, e.g., the location information provided in the location 416 field.

Event notification element values may be set by default (via the engine 104), by optimal determination (step 210), user-programmed, or a combination of the above. Fields for event notification elements 404 may include alert system identifier 418 (e.g., identification of the alert system to be notified), alert time 420 (e.g., time of event notification execution), alert format 422 (e.g., chimes, buzzer, ring tone, music, etc.), and other suitable notification elements desired.

The event information from step 202 is replicated to any other calendaring applications associated with user at step 208. Replication, or synchronization, may be accomplished using any suitable synchronization method and tools as desired.

At step 210, the event notification engine 104 determines optimal notification element values for the event. As described above, a heuristic approach may be utilized for evaluating and determining optimal notification element values. Further, the heuristic approach may be combined with user-programmed notification element values in determining the optimal notification element values. An exemplary process for determining optimal notification element values is described further in FIG. 6.

At step 212, the results of the determination performed in step 210 are stored in the event record. The event notification engine 104 monitors the event records in the master event file via the timing function at step 214. At step 216, it is determined whether the timing function has been triggered (i.e., the event record's alert time field 420 value indicates that an event notification is due for execution). If so, the event notification engine 104 generates and transmits the event notification to one or more alert systems specified in the event record at step 218. The process returns to step 202 whereby the event notification engine 104 continues on with the next event record if applicable.

Figure 6:
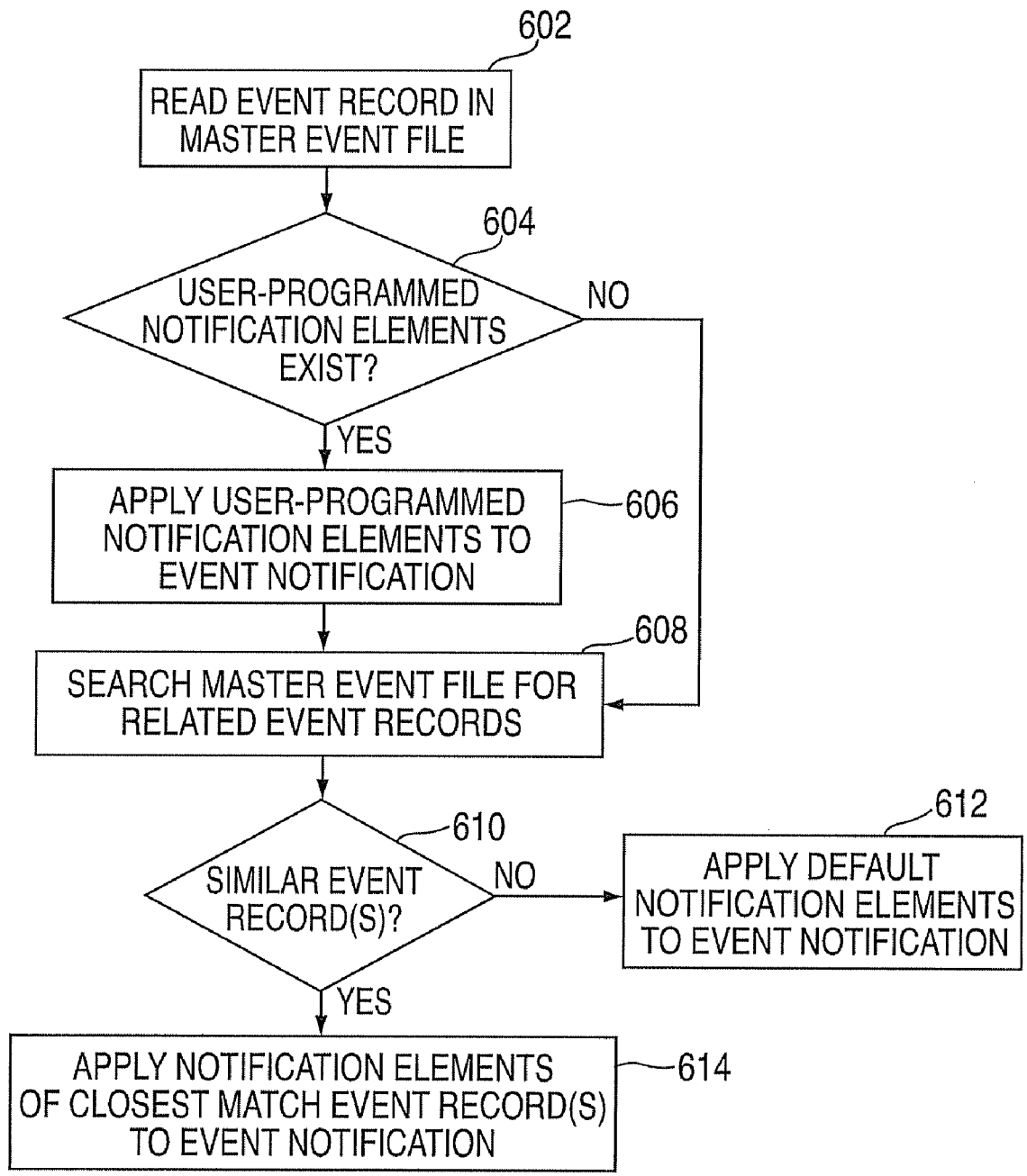
FIG. 6 is a flow diagram describing a process for determining optimal notification elements for an event in exemplary embodiments.

Turning now to FIG. 6, an exemplary process for determining optimal notification element values (FIG. 2, step 210) will now be described. The event notification engine 104 reads an event record to be processed from master event file 105 at step 602. The event notification engine 104 checks the notification elements 404 to determine if the user has provided any programmed notification element values (from step 204) at step 604. If so, these values are applied to the event notification at step 606. Subsequent to applying the programmed notification element values to the event notification (step 606), or alternatively, if no user-programmed notification element values exist in the event record (step 604), the event notification engine 104 searches the master event file (e.g., 400) for event records that are similar to the event record to be processed at step 608. A match occurs if the search results reveal that at least one event record contains event information (and optionally event notification elements) that is also found in the event record to be processed. For example, a recurring monthly meeting may be reflected in multiple event records that provide the same location information (e.g., field 416 of FIG. 4) across each of the event records.

If a match occurs at step 610, the notification element values found in the matching event record are copied to the processed event record. For example, suppose a matching event record indicated that a reminder ten minutes prior to a meeting is desired and that a specified cell phone is the preferred method of notification. It may be inferred by the event notification engine 104 that the user prefers this type and form of reminder. Accordingly, these notification element values are copied from the matching event record to the processed event record with the exception of those notification element values that have been already selected/programmed by the user. If any notification element fields in the matching event record are empty, the event notification engine 104 may provide default values or alternatively search for another closest matching event record for these missing elements at step 612.

If, on the other hand, there are no similar event records found, the event notification engine 104 may apply default notification element values to the event notification at step 614. It will be appreciated by those skilled in the art that other methods of determining optimal notification element values may be utilized by the intelligent event notification system and that the processes recited in FIG. 6 are provided for illustration.

The event notification engine 104 may includes additional rules for determining an optimal alert means (e.g., pager, phone, alarm clock, PDA, computer, etc.). This may be accomplished, for example, by logic that determines which device is geographically closest to the individual and whether it is capable of receiving and communicating an alert. For example, computer device 102 is turned on and the individual is logged into the computer. This information may be used by event notification engine 104 in determining whether it is best to send an alert via phone or email. Time factors may also be considered in determining which device should be alerted (e.g., send alerts to alarm clock 122 if the alerts are due for transmittal before 7:00 a.m.). Additionally, calendar entries in one of applications 106-110 may be used in this determination using the location field. For example, if the location of an event is an office, the event notification engine 104 may determine that a cell phone 114 or office email address is the most appropriate form of communicating the alert. Thus, the intelligent event notification services facilitate combined user-preferences with learned behavior and historical patterns to determine the most appropriate forms and means of alerts such that individual users need not actively and repeatedly enter in settings for each and every activity or event.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for providing an intelligent event notification, the computer program product including instructions stored in a computer-readable storage medium for performing:
    selecting a type of event notification for an event, the type is selected based, in part, on information elements associated with the event;
    determining at least one optimal alert system to receive an event notification corresponding to the type of event notification selected, the determining based in part on information elements associated with the event;
    associating an alert trigger with the event notification; and
    transmitting the event notification to the at least one optimal alert system upon activation of the alert trigger;
    wherein the event notification type includes a supplemental information notification, the supplemental information notification specifying activities to be performed in advance of, or in preparation for, the event.

2. The computer program product of claim 1, further comprising instructions for performing:
    reading the event from an electronic calendar, the event comprising at least one of:
    a meeting;
    an appointment;
    a trip;
    a teleconference;
    a video conference;
    a seminar; and
    an obligatory activity.

3. The computer program product of claim 1, wherein the event notification types further include:
    a reminder;
    a wake-up call; and
    a recurring reminder at specified time intervals.

4. The computer program product of claim 3, wherein the activities include at least one of:
    a reservation;
    an event confirmation;
    a car rental;
    a dry cleaning order or pickup; and
    personal matters.

5. The computer program product of claim 1, wherein the optimal alert system comprises at least one of:
    an email program;
    a telephone;
    a pager;
    a personal digital assistant;
    a computer;
    an instant messaging program;
    an MP3 player;
    an alarm clock; and
    an alarm watch.

6. The computer program product of claim 1, wherein the alert trigger comprises a time for executing the event notification.

7. The computer program product of claim 1, further comprising:
    selecting an alert format from a group of alert format types; and
    associating the alert format with the event notification;
        wherein the transmitting the event notification includes:
            presenting the event notification to the at least one alert system in the alert format selected, the alert form types including:
            audio tones;
            video images;
            mechanical vibration;
            music;
            light emission; and
            multi-media.

8. The computer program product of claim 1, wherein the selecting, determining, and associating are accomplished heuristically by comparing the information elements associated with the event with similar information elements associated with a previously-occurring event and applying the event notification, alert system, and alert trigger of the previously-occurring event to the event.

9. The computer program product of claim 1, wherein at least one of the selecting, determining, and associating are accomplished, in part, by applying at least one user-specified event notification type, alert system, and alert trigger to the event.

10. A system for providing an intelligent event notification, comprising:
    an event notification engine in communication with at least one alert system, the event notification operable for performing:
    selecting a type of event notification for an event, the type is selected based, in part, on information elements associated with the event;

determining at least one optimal alert system to receive an event notification corresponding to the type of event notification selected, the determining based in part on information elements associated with the event;

associating an alert trigger with the event notification; and transmitting the event notification to the at least one optimal alert system upon activation of the alert trigger;

wherein the event notification type includes a supplemental information notification, the supplemental information notification specifying activities to be performed in advance of, or in preparation for, the event.

11. The system of claim 10, wherein the event notification engine is in communication with an electronic calendar, the event notification engine further performing:

reading the event from the electronic calendar, the event comprising at least one of:

a meeting;
an appointment;
a trip;
a teleconference;
a video conference;
a seminar; and
an obligatory activity.

12. The system of claim 10, wherein the event notification types further include:

a reminder;
a wake-up call; and
a recurring reminder at specified time intervals.

13. The system of claim 12, wherein the activities include at least one of:

a reservation;
an event confirmation;
a car rental;
a dry cleaning order or pickup; and
personal matters.

14. The system of claim 10, wherein the optimal alert system comprises at least one of:

an email program;
a telephone;
a pager;
a personal digital assistant;
a computer;
an instant messaging program;
an MP3 player;
an alarm clock; and
an alarm watch.

15. The system of claim 10, wherein the alert trigger comprises a time for executing the event notification.

16. The system of claim 10, wherein the event notification engine further performs:

selecting an alert format from a group of alert format types; and associating the alert format with the event notification;

wherein the transmitting the event notification includes:

presenting the event notification to the at least one alert system in the alert format selected, the alert form types including:

audio tones;
video images;
mechanical vibration;
music;
light emission; and
multi-media.

17. The system of claim 10, wherein the selecting, determining, and associating are accomplished heuristically by comparing the information elements associated with the event with similar information elements associated with a previously-occurring event and applying the event notification, alert system, and alert trigger of the previously-occurring event to the event.

18. The system of claim 10, wherein at least one of the selecting, determining, and associating are accomplished, in part, by applying at least one user-specified event notification, alert system, and alert trigger to the event.

* * * * *